US008607310B2

(12) United States Patent
Holovacs et al.

(10) Patent No.: US 8,607,310 B2
(45) Date of Patent: Dec. 10, 2013

(54) ASSOCIATION OF IN-BAND AND OUT-OF-BAND IDENTIFICATION CREDENTIALS OF A TARGET DEVICE

(75) Inventors: Jayson T. Holovacs, Dunellen, NJ (US); Neil S. Weinstock, Morristown, NJ (US); Siva Somasundaram, Dayton, NJ (US)

(73) Assignee: Raritan Americas, Inc., Somerset, NJ (US)

( * ) Notice: Subject to any disclaimer, the term of this patent is extended or adjusted under 35 U.S.C. 154(b) by 1421 days.

(21) Appl. No.: 11/405,244

(22) Filed: Apr. 17, 2006

(65) Prior Publication Data

US 2007/0245408 A1 Oct. 18, 2007

(51) Int. Cl.
*G06F 7/04* (2006.01)

(52) U.S. Cl.
USPC .......................................................... 726/4

(58) Field of Classification Search
USPC .............................................. 726/4, 5, 6, 7
See application file for complete search history.

(56) References Cited

U.S. PATENT DOCUMENTS

| 6,418,225 B2 * | 7/2002 | Stratton et al. ............. 380/281 |
| 2006/0190238 A1 * | 8/2006 | Autor et al. ................. 703/25 |
| 2006/0205354 A1 * | 9/2006 | Pirzada et al. ............. 455/66.1 |

OTHER PUBLICATIONS

The International Search Report and Written Opinion by the International Searching Authority, issued on Oct. 7, 2008, in the PCT application No. PCT/US07/06311.

* cited by examiner

*Primary Examiner* — Philip Chea
*Assistant Examiner* — Daniel Hoang

(57) ABSTRACT

An association between a system's in-band identification credentials with out-of-band identification credentials may arise by making a universal serial bus device emulation in the form of either a virtual mass storage device or a virtual network adaptor. In the case of the former, a machine readable name is decoded to determine which KVM port a target device is connected to. Such can be used to associate a system's known in-band identification credentials with decoded out-of-band identification credentials from the virtual mass storage device. In the case of the latter, the target may be searched and queried through an out-of-band path to ascertain in-band identification credentials.

7 Claims, 2 Drawing Sheets

ASSOCIATION OF IN-BAND AND OUT-OF-BAND IDENTIFICATION CREDENTIALS OF A TARGET DEVICE

The present invention relates to making an association between the in-band and out-of-band identification credentials of a target device. An emulation of a USB device may be utilized that may be, but is not limited to, emulating a mass storage device or a network adaptor.

When a target (e.g., a server) is managed by both in-band (network-based) and out-of-band (non-network based; e.g. keyboard, video, mouse (KVM)) management solutions, there is no convenient way to associate the means of accessing the target in the out-of-band system ("out-of-band identification credentials") with the means of accessing that same target in the in-band system ("in-band identification credentials"). Associating a target's in-band and out-of-band identification credentials enables a convenient single point of access to the target through either means. In a typical deployment, the only solution is for the customer to input this information manually, a process which can be both time consuming and error-prone, especially when the number of managed targets is large. It is desired to provide a way to make such an association automatically.

SUMMARY OF THE INVENTION

One aspect of the invention is directed at making an association of the in-band and out-of-band identification credentials of a target device. Such may involve emulation of any universal serial bus (USB) device, such as a mass storage device or a network adaptor, by an out-of-band management device for purposes of creating the association of the in-band and out-of-band identification credentials of a target device. This may be done by advertising the out-of-band identification credentials to the target device, to enable discovery through the in-band system, or else actively discovering the target device's in-band identification credentials from the out-of-band device. Once a single system knows both sets of identification credentials, the association can be made.

The emulated (or "virtual") mass storage device may be provided with a machine readable name that can be decoded for identification of which keyboard, video, mouse (KVM) port is used for out-of-band access to the target. This information, and therefore the target device's out-of-band identification credentials, may be discovered through an in-band path. The emulated (or "virtual") network adaptor may be configured to enable the out-of-band management device to search the target device for information and management services to query about in-band identification credentials of the target device through an out-of-band path.

BRIEF DESCRIPTION OF THE DRAWINGS

For a better understanding of the present invention, reference is made to the following description and accompanying drawings, while the scope of the invention is set forth in the appended claims.

DETAILED DESCRIPTION OF THE INVENTION

This invention preferably emulates any USB device, such as standard USB devices supported by modern operating systems, to link or associate in-band and out-of-band data. The basic idea is that by emulating a conventional USB device such as a mass storage device or a network adaptor, one can communicate between an out-of-band channel to an in-band channel and hence be able to link or associate the in-band identification of a target device with its out-of-band identification. Any type of mass storage device may be emulated, such as CD ROMS, media cards, hard disks, or flash disks. The network adaptor represents a bridge connection between a computer and a network.

In the mass storage emulation, a virtual disk drive of the invention is connected to the USB port of the target device. This virtual disk drive has a machine-readable name (used as a signature for identification of the mounted virtual drive) that can be decoded to determine which KVM port is connected to the target device. A separate discovery device, such as Raritan Computer's CommandCenter NOC (CC-NOC), is capable of polling discovered systems over the network (in-band) and finding the virtual drives. By decoding the name, the CC-NOC would then be capable of associating the discovered system's known in-band identification credentials with the out-of-band identification credentials decoded from the virtual mass storage device's drive name. The CC-NOC provides centralized management through a single sign-on to a single interface, with secure, anytime, anywhere access via Web browser. It may support multiple data centers.

In the network adaptor emulation, such as emulating an Ethernet network adaptor or a wireless network adaptor, a virtual network adaptor of the present invention is connected via USB, providing a new network interface to the target device. Communicating through this new interface, the out-of-band management device then searches the target for information and management services such as Windows Management Instrumentation (WMI) or Simple Network Management Protocol (SNMP). Such services are then queried across the same interface to find out information about the system's in-band identification credentials (or indeed to query any type of information).

Figure 1:
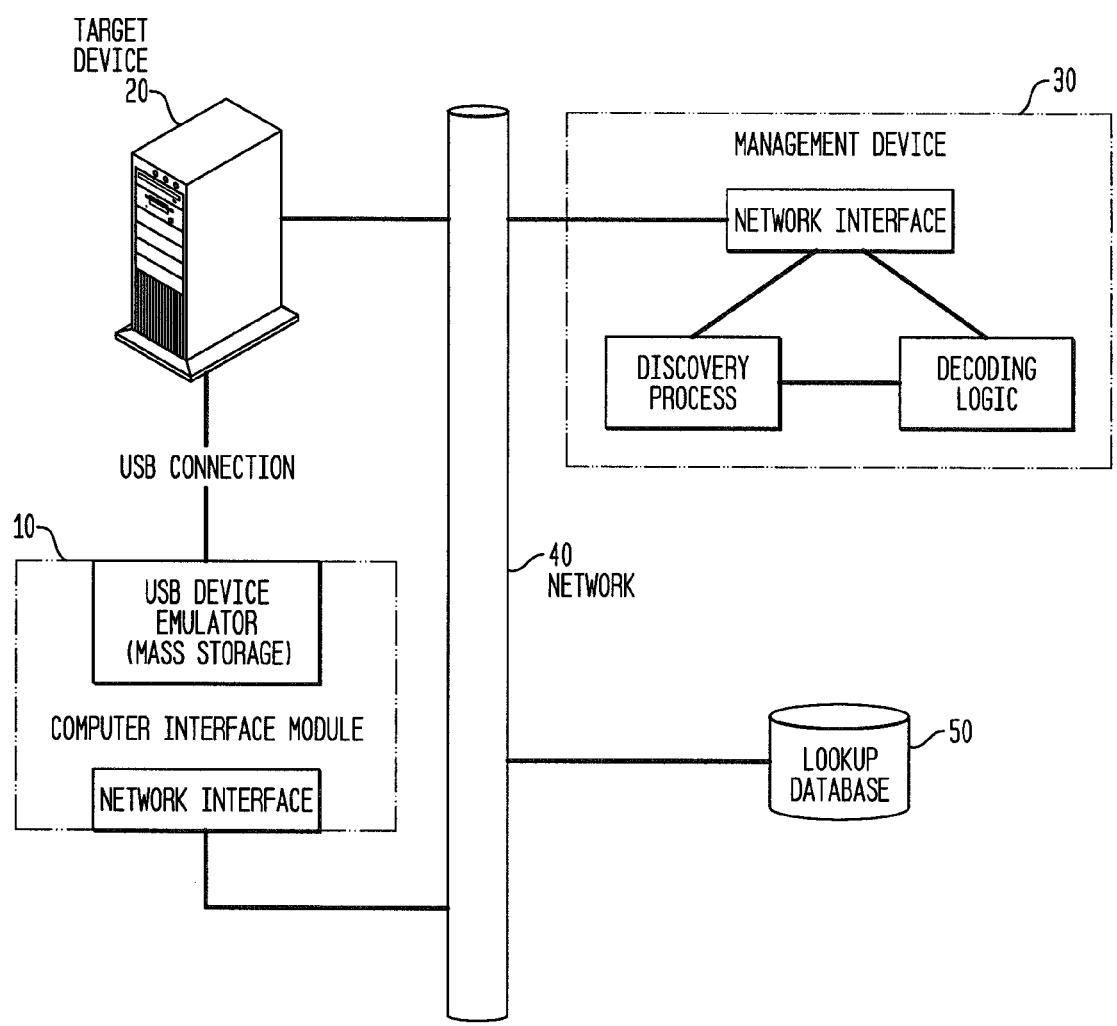
FIG. 1 is a schematic diagram of a mass storage emulation embodiment in accordance with the present invention.

FIG. 1 shows the mass storage device emulation for in-band and out-of-band linkage or association. There is a Computer Interface Module (CIM) 10, which may be a single digital KVM or management product, or a complete system with multiple component products and functions that work together. The CIM represents an out-of-band management device.

In addition to the CIM 10, a target device 20, such as a server, and an in-band management device 30 are connected to a network 40. The CIM 10 and the target server are connected to each other via USB, and possibly by a video connection as well if the CIM is providing KVM access to the target.

The USB device emulator of the CIM 10 registers itself as a USB mass storage device. The target server 20 recognizes the USB device and mounts it as a local drive.

The in-band management device 30 sees the mounted local drive appear on target server 20 via industry standard discovery methods such as web services or other management protocols like Windows Management Instrumentation (WMI). The management device 30 decodes the drive name to determine the identity of the CIM 10 connected to the target server 20. The decoding is performed via an algorithm or through lookup in an external database 50.

As a result of this decoding, the out-of-band address or identification credentials of the target server 20 become known to the in-band management device 30 in association with or linked with the known in-band address or identification credentials of the target server 20. This association or linkage is stored by the management device 30 or in the lookup database for future use and shared with other components as needed.

Figure 2:
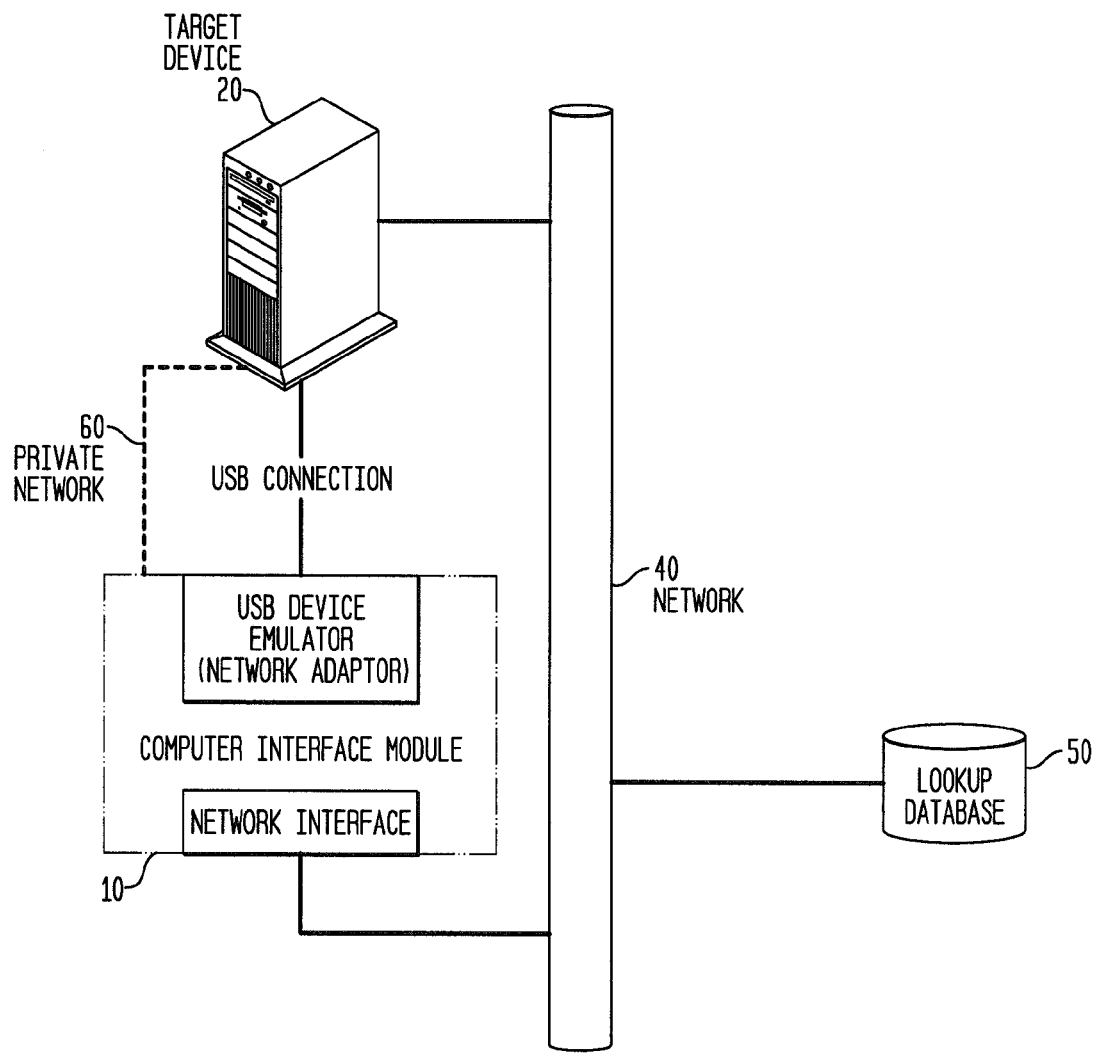
FIG. 2 is a schematic diagram of the network adaptor embodiment in accordance with the present invention.

FIG. 2 shows the network adaptor emulation with management protocol for identifying in-band identification credentials from the out-of-band system. There is the Computer Interface Module (CIM) 10, which may be a single digital KVM or management product, or a complete system with multiple component products and functions that work together. The CIM 10 and target device 20, such as a server, are shown in connection with the external network 40. The USB emulator of the CIM 10 registers itself as a USB network adaptor. The target device 20 recognizes the registered USB network adapter and mounts it as a network interface. A private network 60 is created between the CIM 10 and the target device 20, through which the two may communicate.

In effect, when the USB emulator registers itself as a USB network adaptor, it becomes a virtual network adaptor. When such a virtual network adaptor is turned on, it appears to the target device 20 as a built-in network interface. The network that connects to that interface is completely contained within the CIM 10 and therefore "private", giving rise to the private network 60. Such a private network 60 logically connects the target device 20 and the CIM 10.

Typically, the target device 20 will immediately attempt to acquire an IP address for its new interface by broadcasting a Dynamic Host Configuration Protocol (DHCP) request. The CIM 10 receives this request, and may examine it to extract the target device's 20 host name, which may provide sufficient in-band identification credentials for the current purpose. The CIM 10 associates this information with the target's known out-of-band identification credentials and stores this information locally or in the lookup database 50 so it can be shared with other management devices as needed.

If further information is desired, the CIM 10 serves an IP address to the target device 20 via DHCP. At this point, the CIM 10 knows the IP address of the target device 20 on the private network 60.

The CIM 10 may discover management services on the target device 20, such as SNMP or WMI, via network communications across the private network. The CIM 10 sends management information requests to the discovered management services. The target device 20 answers the management requests and provides its in-band identification credentials. The CIM 10 associates this information with the target's known out-of-band identification credentials and stores this information locally or in the lookup database 50 so it can be shared with other management devices as needed.

The CIM 10 may also discover the in-band identification credentials of the target device 20 by querying the target device 20 across the private network for file share services. If the target device 20 supports such services, it will respond back to the CIM 10 with information sufficient to determine the target device's 20 in-band identification credentials.

While the foregoing description and drawings represent the preferred embodiments of the present invention, it will be understood that various changes and modifications may be made without departing from the scope of the present invention.

What is claimed is:

1. A method to ascertain an association between in-band and out-of-band identification credentials of a target device, comprising the steps of:
    providing a computer interface module (CIM) connected to an in-band network, the CIM including a virtual device comprising one of a virtual drive or virtual network adapter appearing at a port of the target device through an out-of-band path, the virtual device being operative to detect the in-band identification credentials of the target device by querying the target device over the out-of-band path when the virtual device comprises a virtual network adapter or to provide the out-of-band identification credentials to the target device over the out-of-band path when the virtual device comprises a virtual drive;
    detecting one of the in-band identification credentials over the out-of-band path or the out-of band identification credentials over an in-band path by a management device connected to the in-band network;
    associating the detected in-band identification credentials or out-of-band identification credentials of the target device by the management device with the other of the out-of-band identification credentials or in-band identification credentials of the target device; and
    storing information indicative of the association between the in-band identification credentials and out-of-band identification credentials in a database accessible to the management device,
    wherein the other credentials are previously known to the management device,
    wherein the CIM and the target device are physically distinct devices,
    wherein the detecting step further comprises the step of decoding or looking up a machine-readable name of the virtual drive when the virtual device comprises a virtual drive or the step of extracting a host name of the target device when the virtual device comprises a virtual network adapter.

2. The method of claim 1, further comprising the steps of:
    providing a CIM comprising a virtual mass storage device as a virtual drive, the virtual mass storage device having a machine-readable name;
    providing an in-band management device as the management device;
    polling over the in-band network by the in-band management device to find a local drive appearing on a target device, the local drive corresponding to the virtual mass storage device;
    obtaining the machine-readable name by the in-band management device from the target device over the in-band network, the machine-readable name provided by the virtual mass storage device to the target device over the out-of-band path;
    decoding or looking up the machine-readable name by the in-band management device and, as a result of same, identifying the out-of-band identification credentials of the target device from the name of the local drive and associating the previously known in-band identification credentials of the target device with the identified out of band identification credentials of the target device.

3. The method of claim 2, further comprising the step of:
    determining an identity of a keyboard, video and mouse (KVM) port associated with the CIM based on the step of decoding of the machine-readable name of the virtual mass storage device to identify the out-of-band identification credentials.

4. The method of claim 1, further comprising the steps of:
    providing a CIM comprising a virtual mass storage device as a virtual drive, the virtual mass storage device having a machine-readable name
    providing a CIM comprising a virtual network adaptor as the virtual device;

providing an out-of-band management device as the management device, the CIM comprising the out-of-band management device;
receiving a request for an Internet protocol address by the virtual device from the target device over the out-of-band path;
extracting a host name of the target device by the out-of-band management device from the request for an Internet protocol address that contains in-band identification credentials of the target device; and
associating the extracted in-band identification credentials of the target device with the previously-known out-of-band identification credentials of the target device.

5. A system for associating in band identification credentials and out of band identification credentials of a target device, comprising:
a computer interface module (CIM) including a virtual device appearing at a port of the target device via an out-of-band path and comprising one of a virtual drive or a virtual network adapter, the virtual device for detecting the in-band identification credentials by querying the target device over the out-of-band path when the virtual device comprises a virtual network adapter or generating the out-of-band identification credentials and providing the out-of-band identification credentials to the target device over the out-of-band path when the virtual device comprises a virtual drive, the CIM being connected to an in-band network and the virtual device connected to the target device through an out-of-band path;
a management device connected to the in-band network for detecting one of the in-band identification credentials over the out-of-band path or the out-of-band identification credentials over an in-band path, wherein the management device is further operative to associate the detected in band identification credentials or out-of-band identification credentials of the target device with the other of the out of band identification credentials or in-band identification credentials of the target device; and
a database accessible to the management device for storing information indicative of the association between the in-band identification credentials and out-of-band identification credentials,
wherein the other credentials are previously known to the management device, and
wherein the CIM and the target device are physically distinct devices, and
wherein the management device is further operative to decode or look up a machine-readable name of the virtual drive when the virtual device comprises a virtual drive, or to extract a host name of the target device when the virtual device comprises a virtual network adapter.

6. The system of claim 5, wherein:
the virtual device of the CIM comprises a virtual mass storage device operative to provide a machine readable name to the target device over the out of band path,
the management device comprises an in-band management device operable to decode the machine readable name by accessing the target device over the in-band network to thereby discover the out of band credentials, and
the in-band management device associates the out of band credentials with the previously known in-band credentials.

7. The system of claim 5, wherein;
the virtual device of the CIM mounts a virtual network adaptor to the target device over the out-of-band path,
the target device broadcasts a request over the out-of-band path that includes a host name of the target device that contains in-band identification credentials of the target device,
the management device comprises an out-of-band management device,
the CIM comprises the out-of-band management device, and
the CIM is operative to associate the in-band identification credentials of the target device with the out-of-band identification credentials of the target device, the latter of which are previously known to the CIM.

* * * * *